United States Patent [19]

Nozaki et al.

[11] Patent Number: 4,884,370

[45] Date of Patent: Dec. 5, 1989

[54] WEATHER STRIP FOR USE IN AUTOMOBILE

[75] Inventors: Masahiro Nozaki; Atusi Hikosaka, both of Aichi, Japan

[73] Assignee: Toyoda Gosei Co., Ltd., Nishikasugai, Japan

[21] Appl. No.: 309,218

[22] Filed: Feb. 13, 1989

[30] Foreign Application Priority Data

May 18, 1988 [JP] Japan ............................ 63-65675[U]

[51] Int. Cl.⁴ ............................................ E06B 7/16
[52] U.S. Cl. ....................................... 49/479; 49/490; 49/497
[58] Field of Search ......................... 49/479, 490, 497

[56] References Cited

U.S. PATENT DOCUMENTS

| | | | |
|---|---|---|---|
| 4,010,573 | 3/1977 | Andrzejewski | 49/479 |
| 4,513,044 | 4/1985 | Shigeki et al. | |
| 4,769,947 | 9/1988 | Ogawa et al. | 49/479 |
| 4,787,668 | 11/1988 | Kawase et al. | |

FOREIGN PATENT DOCUMENTS 59-35221 3/1984 Japan .

Primary Examiner—Philip C. Kannan
Attorney, Agent, or Firm—Cushman, Darby & Cushman

[57] ABSTRACT

A weather strip for mounting relative to a door opening in an automobile includes an elongated body including a longitudinal trim portion of a U-shaped cross-section for being fitted on a peripheral flange formed on the periphery of the door opening, a hollow seal portion formed on an outer face of one of opposed arms of the trim portion, and a sealing lip for sealing engagement at its distal edge with a surface defining the door opening. A door of the automobile is adapted to be sealingly engaged at its peripheral edge portion with the seal portion. The strip body includes two straight elements of rubber and a corner element of molded rubber interconnecting the straight elements at their one ends and molded integrally therewith. The sealing lip of the straight element is formed on one end of the one arm of the trim portion. The seal portion of the corner element has one longitudinal edge portion disposed in spaced, opposed relation to the one end of the one arm of the trim portion of the corner element at a region intermediate opposite ends of the seal portion to form a longitudinal opening therebetween. The one longitudinal edge portion is integrally continuous with the sealing lip of each straight element so as to serve as the sealing lip of the corner portion. The longitudinal opening is used for removing a core from the corner element after the molding of the corner element.

3 Claims, 2 Drawing Sheets

WEATHER STRIP FOR USE IN AUTOMOBILE

BACKGROUND OF THE INVENTION

1. Field of the Invention

This invention relates generally to a weather strip for mounting relative to a door opening in an automobile so as to provide a seal between the door opening and an associated automobile door, and more particularly to such a weather strip having a corner portion having an improved sealing effect.

2. Prior Art

FIGS. 4 to 6 show one conventional weather strip 1 to be mounted on a periphery of a door opening in an automobile as shown in FIG. 1. This conventional weather strip comprises a body including a trim portion 11 of a U-shaped cross-section for fitting on a peripheral flange 3 on the door opening, a hollow seal portion 12 with which a door 20 of the automobile is adapted to be sealingly engaged, and a sealing lip 13 formed on a distal end of one arm of the U-shaped trim portion 11 for being sealingly engaged at its distal end or edge with a surface defining the door opening.

The weather strip body comprises two straight elements 1A and 1B of extruded rubber and a corner element 1C of molded rubber interconnecting the straight elements 1A and 1B at their one ends and molded integrally therewith. The reason for the use of such molded corner element 1C is that if the weather strip body is made solely of an extruded element, the seal portion 12 is deformed at a corner portion C (FIG. 1) of the door opening to such an extent that the sealing effect is adversely affected.

For joining two extruded straight elements 1A and 1B of the weather strip body together through the corner element 1C, generally, one ends of the two elements 1A and 1B are placed in a cavity of a mold in generally perpendicular relation to each other, with a core inserted in the mold cavity. Then, a molding material is poured into the cavity, that is, a space defined by the cavity surfaces and the core to form a corner element 1C interconnecting the two straight elements 1A and 1B and molded integrally therewith. After this molding operation, the mold is removed, and then an opening is formed in the corner element 1C to remove the core therefrom. Therefore, the resulting corner element 1C has a core-removing opening 2.

Conventionally, the core-removing opening 2 is provided in the inner side of the curved portion of the corner element 1C, and an adhesive or the like is applied to the edges of the opening 2 to bond them together to close the opening 2 after the core is removed from the molded corner element 1C.

When the core-removing opening 2 is closed in this manner, the seal portion 12 of the corner element 1C is radially contracted into a smaller cross-section as indicated in broken lines at 12' in FIG. 6. Thus, this seal portion 12 is reduced in size, and therefore there is a risk that its sealing effect is affected. Further, the core-removing opening 2 is exposed to an external view when the weather strip 1 is mounted on the automobile, which detracts from the appearance.

SUMMARY OF THE INVENTION

It is therefore an object of this invention to provide a weather strip for automobiles in which a core-removing opening is concealed from an external view when mounted on the automobile, and a molded corner element can maintain a good sealing effect.

According to the present invention, there is provided a weather strip for mounting relative to a periphery of a door opening in an automobile which strip comprises an elongated body including (i) a longitudinal trim portion of a U-shaped cross-section for being fitted on a peripheral flange formed on the periphery of the door opening, the trim portion being defined by a pair of opposed arms and a base interconnecting the arms at their one ends, (ii) a hollow seal portion formed on an outer face of one of the opposed arms of the trim portion and extending therealong, a door of the automobile being adapted to be sealingly engaged at its peripheral edge portion with the seal portion, and (iii) a sealing lip for sealing engagement at its distal edge with a surface defining the door opening;

the strip body comprising two straight elements of rubber and a corner element of molded rubber interconnecting the straight elements at their one ends and molded integrally therewith;

the sealing lip of the straight element being formed on the other end of the one arm of the trim portion; and the seal portion of the corner element having one longitudinal edge portion disposed in spaced, opposed relation to the other end of the one arm of the trim portion of the corner element at a region intermediate opposite ends of the seal portion to form a longitudinal opening therebetween, the one longitudinal edge portion being integrally continuous with the sealing lip of each straight element so as to serve as the sealing lip of the corner portion, the longitudinal opening being used for removing a core from the corner element after the molding of the corner element.

In use, the core-removing opening remains intact, that is, it is not closed by an adhesive or the like. Therefore, the hollow seal portion of the corner element is not contracted radially. Further, since the continuous sealing lip of the weather strip is held in sealing engagement at its distal edge with the surface defining the door opening of the automobile, the core-removing opening is disposed inwardly of the sealing lip and therefore is concealed from an external view, which will not detract from the appearance.

DESCRIPTION OF THE PREFERRED EMBODIMENT OF THE INVENTION

The invention will now be described with reference to the drawings.

Figure 1:
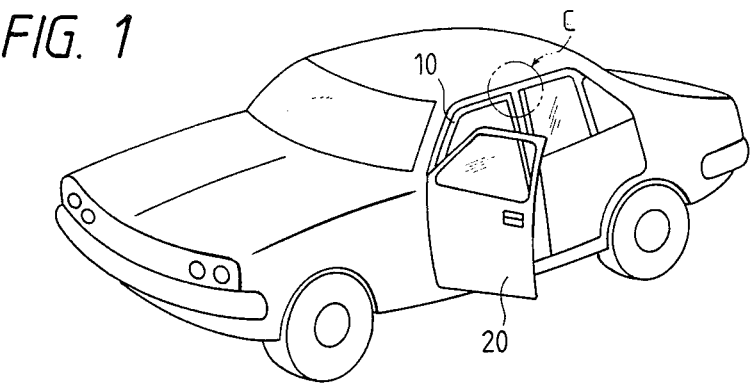
FIG. 1 is a perspective view of an automobile incorporating conventional weather strip.
Figure 2:
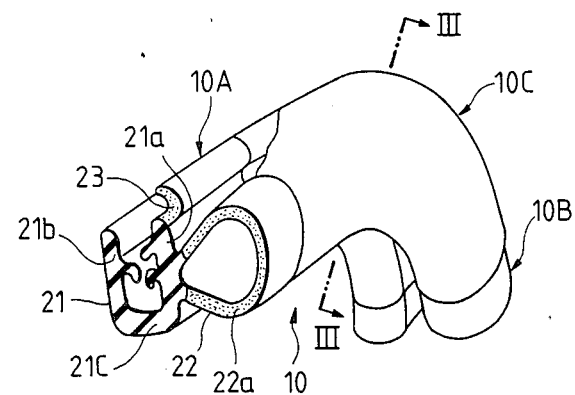
FIG. 2 a partially cross-sectional, perspective view of a portion of a weather strip provided in accordance with the present invention.

A weather strip 10 shown in FIG. 2 is adapted to be mounted relative to a periphery of a door opening of an automobile (see FIG. 1) to provide a seal between the periphery of the door opening and a peripheral edge of a door 20. The weather strip 10 comprises two generally straight elements 10A and 10B and a corner element 10C interconnecting the two straight elements 10A and 10B at their one ends.

Each of the straight elements 10A and 10B is made of extruded rubber. More specifically, the straight element 10A comprises an elongated body which includes a trim portion 21 of a U-shaped cross-section and defined by a pair of opposed arms 21a and 21b and a base 21c interconnecting the arms 21a and 21b at their one ends, and a hollow seal portion 22 defined by a wall 22a of a generally U-shaped cross-section formed on an outer face of the arm 21a of the trim portion 21 and extending therealong, the wall 22a being integrally connected at its opposite longitudinal edges to the outer face of the arm 21a. The door of the automobile is adapted to be sealingly engaged at its peripheral edge or marginal portion with the seal portion 22. The body of the straight element 10A further includes a sealing lip 23 for sealing engagement at its distal end or edge with a surface defining the door opening in the automobile. The other straight element 10B is substantially similar in construction to the straight element 10A.

The trim portion 21 of the straight portions 10A and 10B is made of extruded solid rubber, and their hollow seal portion 22 and sealing lip 23 are made of sponge rubber. The term "solid rubber" here means unfoamed and relatively rigid rubber. The corner element 10C is molded of sponge rubber and is generally similar in cross-section to the straight elements 10A and 10B. More specifically, the corner element 10C comprises an elongated body which is curved at its central portion and includes a trim portion 21' similar in cross-section to the trim portion 21 of the straight elements 10A and 10B, and a hollow seal portion 22' defined by a wall 22'a of a generally U-shaped cross-section formed on an outer face of an arm 21'a of the trim portion 21' and extending therealong. The trim portion 21' is integrally connected at its opposite ends to the respective trim portions 21 and 21 of the straight elements 10A and 10B.

Figure 3:
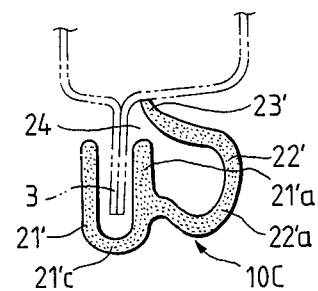
FIG. 3 a cross-sectional view taken along the line III—III of FIG. 2.
Figure 4:
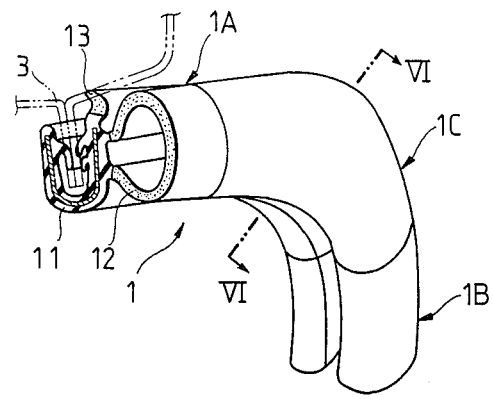
FIG. 4 a view similar to FIG. 2 but showing a conventional strip.
Figure 5:
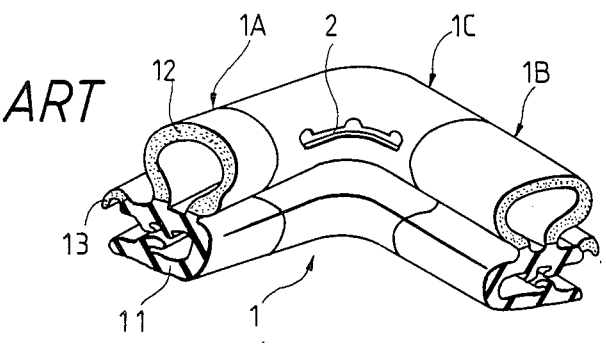
FIG. 5 a partially cross-sectional, perspective view of the conventional strip as seen in another direction.
Figure 6:
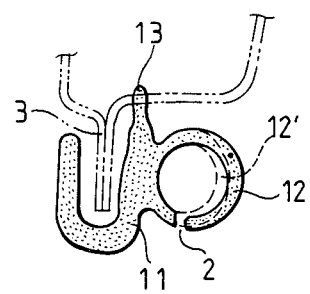
FIG. 6 a cross-sectional view taken along the line VI—VI of FIG. 4.

The wall 22' a of the hollow seal portion 22' of the corner element 10C is integrally connected at one longitudinal edge to the outer face of the arm 21'a of the trim portion 21', the other longitudinal edge of the wall 22'a being disposed in spaced, opposed relation to the end of the arm 21'a of the trim portion 21' remote from a base 21'c to form a longitudinal opening 24 therebetween which is needed to remove a core from the molded corner element 10C after the molding of the corner element 10C as later described. In other words, a lower half (FIG. 3) of the hollow seal portion 22' of the corner element 10C is identical in cross-section to that of the hollow seal portions 22 and 22 of the straight elements 10A and 10B, and is integrally connected therewith at its opposite ends. The other longitudinal edge portion of the wall 22'a serves as a sealing lip 23'. More specifically, the upper half of the sealing portion 22'including the sealing lip 23'is smoothly deformed or curved at opposite end portions thereof in such a manner that the sealing lip 23'is integrally connected at its opposite ends to the sealing lips 23 and 23 of the straight elements 10A and 10B and that the remainder of this upper portion merges into the arms 21a and 21a of the straight portions 10A and 10B at its opposite end portions. In other words, the corner element 10C is identical in cross-section to the straight elements 10A and 10B at its opposite end portions, and therefore the core-removing opening 24 extends between the opposite end portions of the core element 10C.

For preparing the weather strip 10, one ends of the two straight elements 10A and 10B, preformed by extrusion, are placed in position in the mold in right-angular relation to each other, with the core also being set in the mold. Then, a molding material is poured into a cavity of the mold to form the corner element 10C interconnecting the two straight elements 1A and 1B and molded integrally therewith. After this molding operation, the core is removed through the core-removing opening 24.

The core-removing opening 24 remains intact, that is, it is not closed by an adhesive or the like. For mounting the weather strip 10 relative to the door opening of the automobile, the unitary, continuous trim portion of the weather strip 10 constituted by the trim portions 21, 21 and 21'is fitted on a peripheral flange 3 of the door opening, and also the unitary, continuous sealing lip of the weather strip 10, constituted by the sealing lips 23, 23 and 23', is held in sealing engagement at its distal edge with the surface defining the door opening of the automobile. Thus, the core-removing opening 24 is disposed inwardly of the sealing lip 23'and therefore is concealed from an external view, which will not detracts from the appearance. Further, that portion of the corner element 10C adapted to be pressed by the door has substantially the same cross-section as that of the corresponding portion of the straight elements 10A and 10B, and in addition when the weather strip 10 is pressed by the door, the distal edge is pressed against the surface defining the door opening. Therefore, a good sealing effect is achieved.

What is claimed is:

1. A weather strip for mounting relative to a periphery of a door opening in an automobile which strip comprises an elongated body including (i) a longitudinal trim portion of a U-shaped cross-section for being fitted on a peripheral flange formed on the periphery of the door opening, said trim portion being defined by a pair of opposed arms and a base interconnecting said arms at their one ends, (ii) a hollow seal portion formed on an outer face of one of said opposed arms of said trim portion and extending therealong, a door of the automobile being adapted to be sealingly engaged at its peripheral edge portion with said seal portion, and (iii) a sealing lip for sealing engagement at its distal edge with a surface defining the door opening;

said strip body comprising two straight elements of rubber and a corner element of molded rubber interconnecting said straight elements at their one ends and molded integrally therewith;

the sealing lip of said straight element being formed on the other end of said one arm of said trim portion; and the seal portion of said corner element having one longitudinal edge portion disposed in spaced, opposed relation to said other end of said one arm of said trim portion of said corner element at a region intermediate opposite ends of said seal portion to form a longitudinal opening therebetween, said one longitudinal edge portion being integrally continuous with said sealing lip of each straight element so as to serve as said sealing lip of said corner portion, said longitudinal opening being used for removing a core from said corner element after the molding of said corner element.

2. A weather strip according to claim 1, in which said two straight elements are made of extruded rubber.

3. A weather strip according to claim 1, in which the trim portion of each of said two straight elements is made of solid rubber, the sealing lip of each straight element being made of sponge rubber, and said corner element being made of sponge rubber.

* * * * *